United States Patent
Wang et al.

(10) Patent No.: US 8,897,839 B2
(45) Date of Patent: Nov. 25, 2014

(54) METHOD, APPARATUS AND SYSTEM FOR CONTROLLING DISTRIBUTED ANTENNA SYSTEM

(75) Inventors: Hung-Hsiang Wang, Zhudong Township, Hsinchu County (TW); Hsin-An Hou, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 256 days.

(21) Appl. No.: 13/480,855

(22) Filed: May 25, 2012

(65) Prior Publication Data
US 2013/0122830 A1     May 16, 2013

(30) Foreign Application Priority Data
Nov. 10, 2011   (TW) .............................. 100141121 A (51) Int. Cl.
| | |
|---|---|
| *H04M 1/00* | (2006.01) |
| *H04B 17/00* | (2006.01) |
| *H04W 56/00* | (2009.01) |
| *H04W 88/08* | (2009.01) |
| *H04B 7/02* | (2006.01) |
| *H04B 7/06* | (2006.01) |

(52) U.S. Cl.
CPC ........... *H04B 17/009* (2013.01); *H04W 56/004* (2013.01); *H04W 56/0055* (2013.01); *H04W 88/085* (2013.01); *H04B 7/022* (2013.01); *H04B 7/0671* (2013.01)
USPC ........ 455/562.1; 370/294; 370/350; 370/315; 455/423; 455/437

(58) Field of Classification Search
CPC .......................... H04B 10/2575; H04W 24/04
USPC ....................................................... 455/562.1
See application file for complete search history.

(56) References Cited

U.S. PATENT DOCUMENTS

| | | | |
|---|---|---|---|
| 5,805,983 A | 9/1998 | Naidu et al. | |
| 6,023,625 A | 2/2000 | Myers, Jr. | |
| 6,405,018 B1 | 6/2002 | Reudink et al. | |
| 2007/0291730 A1* | 12/2007 | Monfet et al. | ................ 370/350 |
| 2009/0046586 A1 | 2/2009 | Stuart et al. | |
| 2010/0226296 A1* | 9/2010 | Wala et al. | .................... 370/294 |
| 2011/0019999 A1 | 1/2011 | George et al. | |
| 2011/0039497 A1 | 2/2011 | Hammarwall et al. | |

(Continued)

FOREIGN PATENT DOCUMENTS

WO      2009002248 A1    12/2008

OTHER PUBLICATIONS

Gavrilovich, Jr., et al.; "Broadband Communication on the Highways of Tomorrow;" IEEE Communications Magazine; Apr. 2001; pp. 146-154.

(Continued)

*Primary Examiner* — Charles Shedrick
(74) *Attorney, Agent, or Firm* — McClure, Qualey & Rodack, LLP (57) ABSTRACT

A method for controlling a distributed antenna system includes the following steps. A target propagation delay value is defined according to a transmit/receive transition gap. Propagation delay time of a service antenna unit corresponding to a base station is estimated. The service antenna unit is turned on to perform downlink signal transmission, and the propagation delay time of the service antenna unit is compensated to the target propagation delay value.

21 Claims, 10 Drawing Sheets

(56) References Cited

U.S. PATENT DOCUMENTS

2011/0050501 A1   3/2011   Aljadeff
2011/0122769 A1   5/2011   Zhang
2012/0083263 A1*  4/2012   Kim et al. .................... 455/423
2012/0165022 A1*  6/2012   Rimhagen et al. ............ 455/437
2013/0100877 A1*  4/2013   Naslund et al. ............... 370/315

OTHER PUBLICATIONS

Lannoo, B., et al.; "Radio-over-Fiber-Based Solution to Provide Broadband Internet Access to Train Passengers;" IEEE Communications Magazine; Feb. 2007; pp. 56-62.
TW Office Action dated Aug. 6, 2014.

* cited by examiner

METHOD, APPARATUS AND SYSTEM FOR CONTROLLING DISTRIBUTED ANTENNA SYSTEM

This application claims the benefit of Taiwan application Serial No. 100141121, filed Nov. 10, 2011, the subject matter of which is incorporated herein by reference.

TECHNICAL FIELD

The disclosure relates in general to methods, apparatus and system for controlling a distributed antenna system.

BACKGROUND

With the current increase in environmental awareness and the consideration of energy saving economy, the public transportation system has become the major infrastructure with the first priority. In the communication service architecture of the public transportation system, a two-staged service architecture combining the internal-vehicle network with the external-vehicle network is currently and generally applied for providing a whole mobile communication service in a single forward railway carriage to the many passengers.

The radio over fiber (RoF) technique has been widely used in the positions with lower signal receiving qualities, such as a tunnel or a building. Recently, it has further combined the RoF technique with the rail communication system to firstly transform radio signals into optical domain signals to transmit to the remote destination, and to transform the optical domain signals back into electrical domain signals. Thus high frequency signals will not fast fade away in long distance transmission. In the mobile communication, Hand Over/Off is occurred due to the extended range of the base station. The over frequent Hand Over/Off may sharply lower the data transmission efficiency, and even the service is shut down. The influence of the above phenomenon is more obvious in the high-speed mobile communication.

In the rail communication system, the idea of combing the fixed base station with the RoF technique is further proposed due to the characteristic of predictable movements of the public transportation system, and thus a distributed antenna system (DAS) is formed and capable of extending the extended range of the base station. In the meantime, a RF control method is utilized to implement moving cells and avoid the Hand Over/Off. However, the transmitting signals of the RoF technique in the communication system have the same frequency, and a multipath effect may be caused. For the mobile communication system, the multipath effect in the time domain causes the channel variation in the frequency domain, even affects greatly as the multiple paths have similar energy distributions.

For example, the multiple paths having similar energy distributions are easily occurred when the trains moves between two remote antenna units (RAU), thus lowering the receiving qualities, even forcibly shutting down the communication. Combing the moving cells with the service antenna selection is proposed to implement a single line of sight (LoS) signal to lower the multipath effect. For the time domain multiplexing system, directly controlling or selectively turning on the service antenna unit may cause a sudden change of the propagation delay time, hence the uplink signal suffers the timing drift problem because there is no preamble signal to help the synchronization. When errors exceed the receiving capability of the base station, the uplink signal cannot be decoded correctly.

When the distributed antenna system is built, a method for compensating the channels between the base station and the remote antenna units to the same propagation delay time by wiring or adding electrical delay devices is proposed. However, it requires additional fibers or electrical delay devices, and the length of the fibers limit the overall extended range. The propagation delay time of the distributed antenna system includes the signal transmission between the fiber and the air, and the signal is transmitted slower in the fiber than in the air. The longer the length of the used fiber, the smaller the permitted extended range of transmission in the pure air. As it tends to extend the transmission range of the signal, high cost and high density construction is needed; on the other hand, as it tends to improve the extended range of one single antenna, longer fibers cannot be used so that the overall extended range cannot be improved, and thus facing a difficult choice.

SUMMARY

According to the present disclosure, a method for controlling a distributed antenna system is provided. A target propagation delay value is defined according to a transmit/receive transition gap. Propagation delay time of a service antenna unit corresponding to a base station is estimated. The service antenna unit is turned on to perform signal transmission, and the propagation delay time of the service antenna unit is compensated to the target propagation delay value.

According to the present disclosure, a method for controlling a distributed antenna system including the following steps is provided. A target delay variation value is determined, and a target propagation delay value is defined according to a transmit/receive transition gap. Respective propagation delay time of multiple remote antenna units corresponding to a base station are acquired to obtain delay compensation values of the remote antenna units in advance by referring to the target propagation delay value. A service antenna unit is compensated according to corresponding delay compensation value when one of the remote antenna units are turned on to be the service antenna unit to perform signal transmission. Compensated propagation delay time of each remote antenna unit does not exceed the target propagation delay value, and the compensated propagation delay time is a sum of the propagation delay time and the delay compensation value. When the different remote antenna units are switched to be the service antenna unit, a compensated propagation delay time variance of the service antenna unit caused by switching does not exceed the target delay variation value.

According to the present disclosure, an apparatus for controlling a distributed antenna system is provided. The apparatus for controlling a distributed antenna system includes an estimation module, a first control module, a second control module and a delay compensation module. The estimation module estimates respective propagation delay time of multiple remote antenna units corresponding to a base station. The first control module selects one of the remote antenna units to be a service antenna unit according to a target propagation delay value and the propagation delay time of the remote antenna units, and obtains a delay compensation value corresponding to the service antenna unit. The second control module is controlled by the first control module to turn on or turn off downlink signal transmission of the remote antenna units. The delay compensation module is controlled by the first control module to compensate the service antenna unit according to the corresponding delay compensation value when the second control module turns on the service antenna unit.

According to the present disclosure, a system for controlling a distributed antenna system is provided. The system for controlling a distributed antenna system includes a base station, an estimation module, a first control module and a second control module. The estimation module estimates respective propagation delay time of multiple remote antenna units corresponding to the base station. The first control module selects one of the remote antenna units to be a service antenna unit according to a target propagation delay value and the propagation delay time of the remote antenna units, and obtains delay compensation values corresponding to the remote antenna units. The second control module is controlled by the first control module to turn on or turn off downlink signal transmission of the remote antenna units. When the first control module selects the service antenna unit according to the target propagation delay value and the propagation delay time of the remote antenna units, the base station obtains the delay compensation value of the service antenna unit and transmits to a subscriber station, so that the subscriber station adjusts uplink transmission time according to a received delay compensation value.

The disclosure will become apparent from the following detailed description of the preferred but non-limiting embodiments. The following description is made with reference to the accompanying drawings.

DETAILED DESCRIPTION

The disclosure proposes methods, apparatus and system for controlling a distributed antenna system (DAS), capable of utilizing an antenna control mechanism to solve the multipath effect problem of the distributed antenna system, and the timing drift problem caused by the antenna control mechanism.

Figure 1:
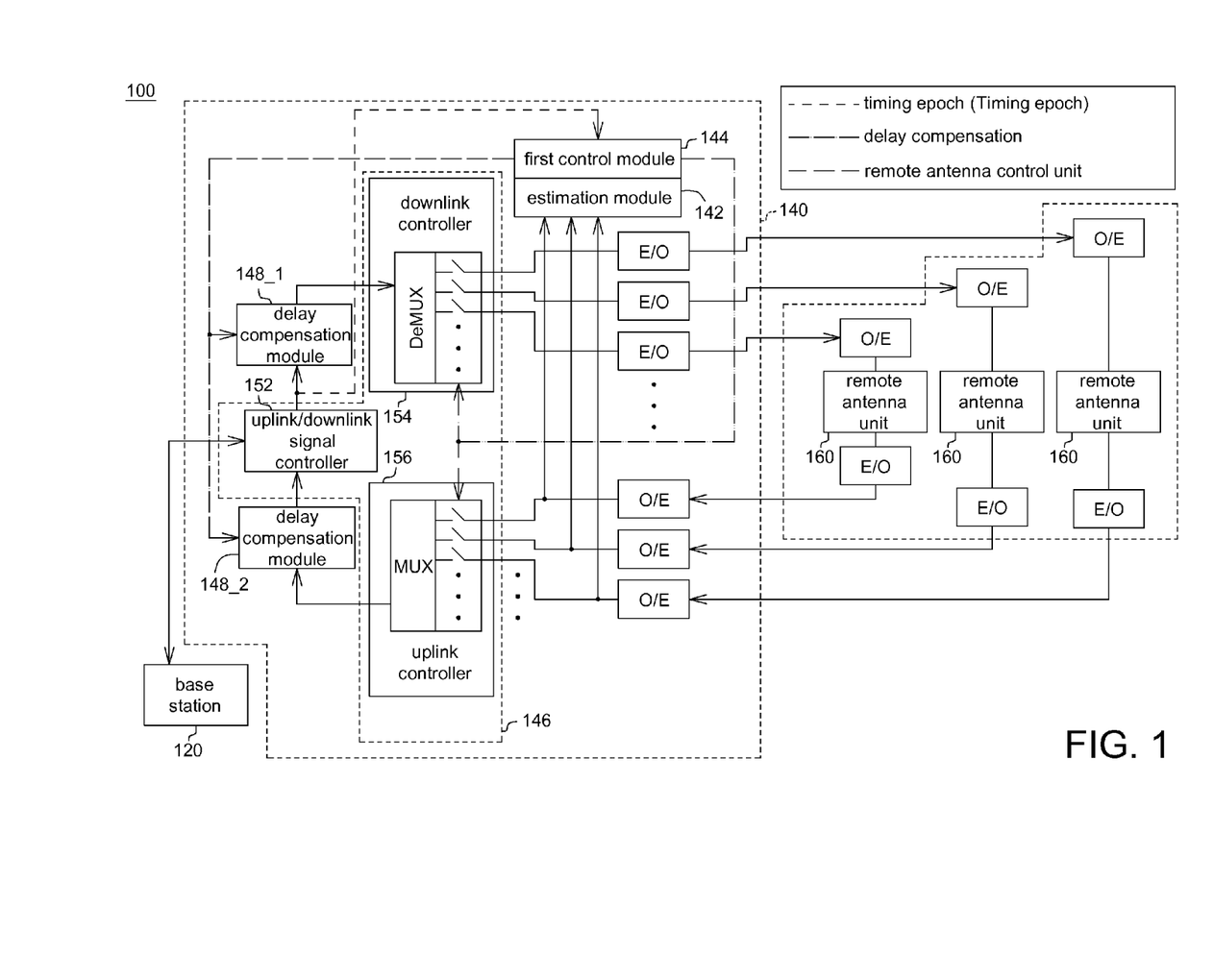
FIG. 1 shows a schematic illustration of a distributed antenna system according to an embodiment.

Referring to FIG. 1, a schematic illustration of a distributed antenna system according to an embodiment is shown. The distributed antenna system 100 includes a base station (BS) 120, a control device 140 and multiple remote antenna units (RAU) 160. The control device 140 is substantially a head end unit (HEU), and communicates with the multiple remote antenna units 160 by the radio over fiber (RoF) technique. Downlink signals outputted from the control device 140 are firstly transformed into optical domain signals by an electrical-to-optical converter E/O and transmitted to the remote end via the fiber, and transformed back into electrical domain signals by a remote optical-to-electrical converter O/E and transmitted to the remote antenna unit 160; likewise, uplink signals outputted from the remote antenna unit 160 are firstly transformed into optical domain signals by an electrical-to-optical converter E/O and transmitted to the control device 140 via the fiber, and transformed back into electrical domain signals by an optical-to-electrical converters O/E of the control device 140.

The control device 140 may include an estimation module 142, a first control module 144, a second control module 146 and delay compensation modules 148_1 and 148_2. The estimation module 142 estimates propagation delay time of the multiple remote antenna units 160 to receive wireless signals with relative cable transmission. The propagation delay time is the signal propagation delay time of the signal transmitted from the receiving end to the base station via the remote antenna unit 160. The propagation delay time includes delays of the wireless signal caused by wireless transmission and cable transmission. The estimation module 142 calculates the propagation delay time of the signal transmitted from the receiving end to the base station 120 via the remote antenna unit 160 according to constant timing epochs, such as preamble signals outputted from the base station 120. For example, power detection may be used to determine whether the uplink signal is received and the time spot is recorded. The propagation delay time is derived from the time spot at which the preamble signal is outputted and the time spot at which the uplink signal is received at the base station 120. The first control module 144 selects one of the remote antenna units 160 to be a service antenna unit according to a target propagation delay value $PD_{max}$ and multiple transmission delay time, and obtains delay compensation values corresponding to the remote antenna units 160.

In an embodiment of the disclosure, the timing difference between data uplink and data downlink is kept to prevent from the influence of dramatically changed propagation delay time. Take the WiMAX system as being exemplified, and the timing difference between uplink and downlink is a transmit/receive transition gap (TTG), such as 106 µs. The transmit/receive transition gap includes downlink propagation delay time, a subscriber station receive/transmit transition gap (SS-RTG) and uplink propagation delay time. Therefore, the target propagation delay value $PD_{max}$ can be defined as a half of a difference between the transmit/receive transition gap and the subscriber station receive/transmit transition gap; that is, (TTG-SSRTG)/2, such as 28 µs.

The second control module 146 may include an uplink/downlink signal controller 152, a downlink controller 154 and an uplink controller 156. Uplink signals and downlink signals of the base station 120 are separated by the uplink/downlink signal controller 152, which may be implemented by a circulator or a switch controlled by the base station. The downlink controller 154 and the uplink controller 156 are substantially controlled by the first control module 144 to select one of the multiple remote antenna units 160 to be the service antenna unit, and respectively turn on the selected service antenna unit and turn off the other remote antenna units. Turning on/off the antenna is meant to turn on/off the downlink signal transmission via the antenna. In the embodiment in FIG. 1, the two delay compensation modules 148_1 and 148_2 respectively corresponding to the downlink controller 154 and the uplink controller 156 are substantially controlled by the first control module 144, and compensate the service antenna unit according to the corresponding delay compensation value to keep the timing difference between data uplink and data downlink when the second control module 146 turns on the service antenna unit.

Figure 2:
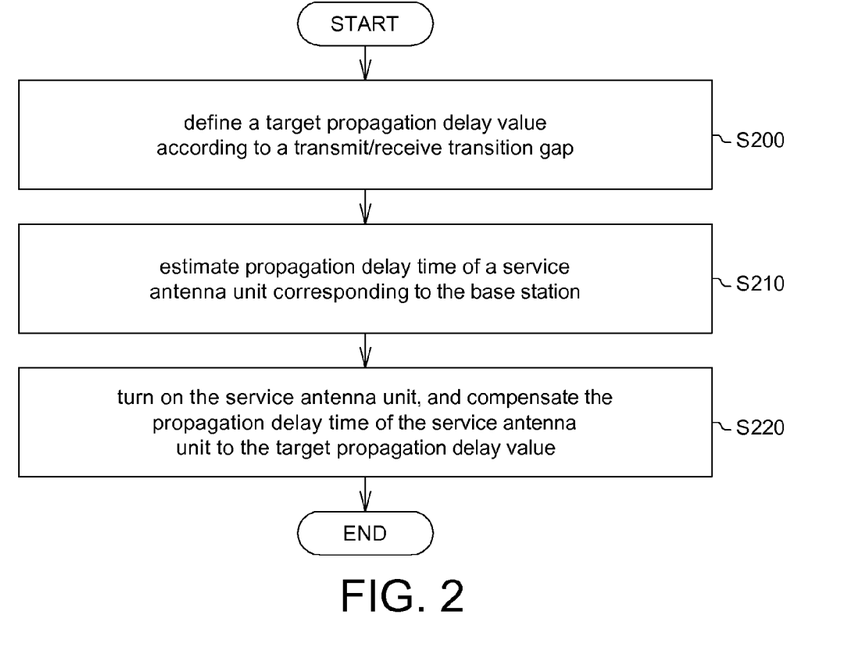
FIG. 2 shows a flow chart of a method for controlling a distributed antenna system according to an embodiment.

Referring to FIG. 2, a flow chart of a method for controlling a distributed antenna system according to an embodiment is shown. In step S200, the first control module 144 defines a target propagation delay value PDmax according to a transmit/receive transition gap. In step S210, the estimation module 142 estimates propagation delay time of a service antenna unit corresponding to the base station 120. In step S220, the second control module 146 turns on the service antenna unit, and the delay compensation modules 148_1 and 148_2 compensate the propagation delay time of the service antenna unit to the target propagation delay value PDmax according to the delay compensation value corresponding to the service antenna unit obtained by the first control module 144.

In said embodiment of the method for controlling a distributed antenna system, the service antenna unit may be the remote antenna unit, which has the corresponding propagation delay time not exceeding the target propagation delay value $PD_{max}$ and receives a receiving signal with a maximum signal strength from a subscriber station and, among the remote antenna units. That is, the propagation delay time not exceeding the target propagation delay value $PD_{max}$ is the preferential selection condition of the service antenna unit, and the remote antenna unit having the higher signal strength of the receiving signal is selected when the preferential selection condition is met.

Figure 3:
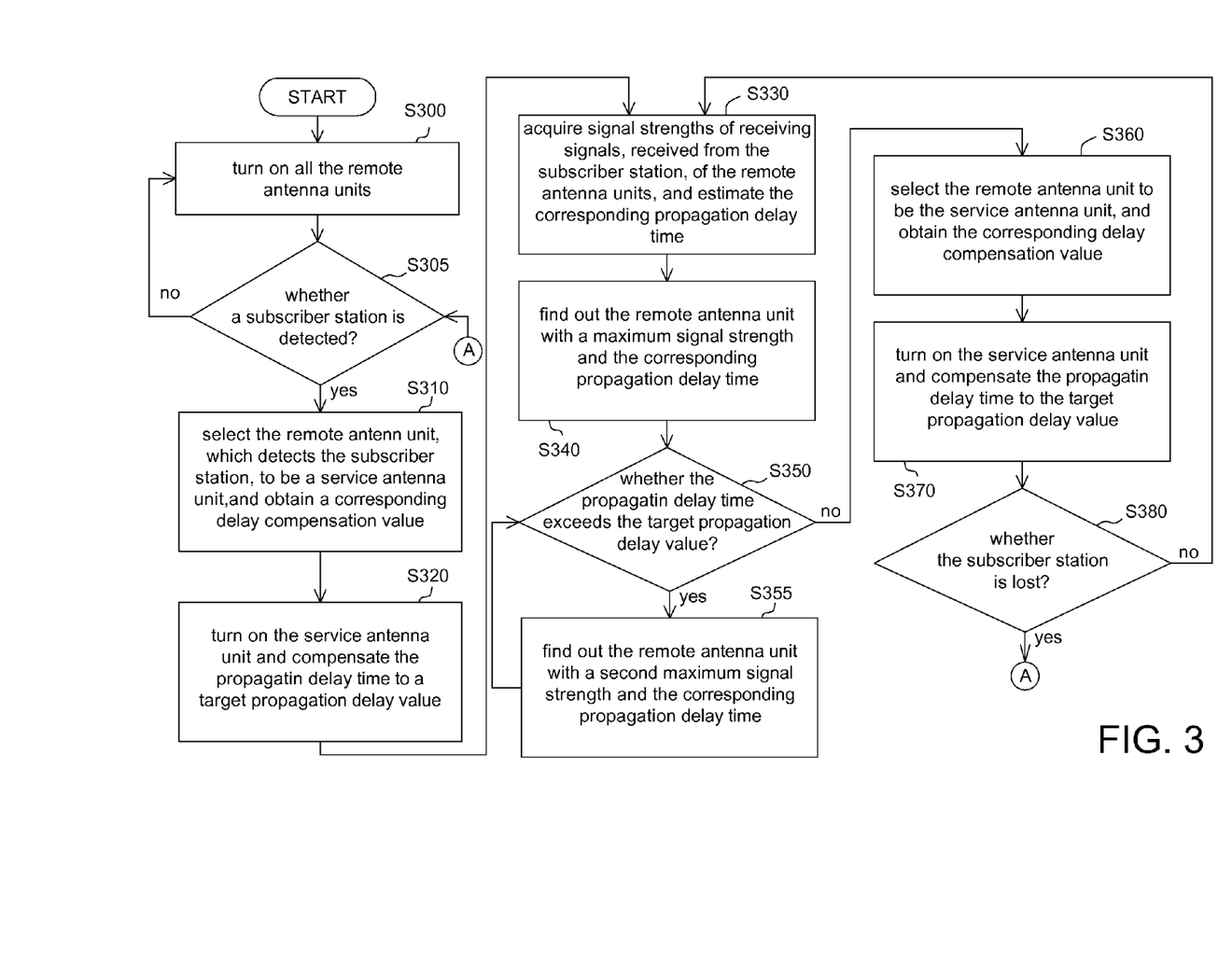
FIG. 3 shows a detailed flow chart of a method for calculating delay compensation values of a distributed antenna system according to an embodiment.

Hereafter take the antenna control mechanism of taking the propagation delay time not exceeding the target propagation delay value $PD_{max}$ as the preferential selection condition and considering the signal strengths as being exemplified, but it is not limited thereto and determined according to the design requirements. Referring to FIG. 3, a detailed flow chart of a method for calculating delay compensation values of a distributed antenna system according to an embodiment is shown. In step S300, all of the remote antenna units 160 are turned on. In step S305, the first control module 144 determines whether any one of the remote antenna units 160 detects a subscriber station. When any one of the remote antenna units 160 detects the subscriber station, in step S310, the first control module 144 selects the remote antenna unit 160, which detects the subscriber station, to be the service antenna unit, the estimation module 142 estimates the propagation delay time, and the first control module 144 calculates a difference between the propagation delay time and the target propagation delay value $PD_{max}$ and obtains the corresponding delay compensation value. The propagation delay time estimated by the estimation module 142 includes delays of the wireless signal caused by wireless transmission and cable transmission. After that, in step S320, the second control module 146 turns on the selected service antenna unit to perform downlink signal transmission through the turned on antenna, and the delay compensation modules 148_1 and 148_2 compensate the propagation delay time of the service antenna unit to the target propagation delay value $PD_{max}$ according to the corresponding delay compensation value.

Steps S330 to S380 are executed in another embodiment. In step S330, the estimation module 142 acquires signal strengths of the receiving signals, received from the subscriber station, of the remote antenna units 160, and estimates the multiple propagation delay time of the remote antenna units 160 corresponding to the base station 120. In step S340, the first control module 144 finds out the remote antenna unit 160 having a maximum signal strength and the corresponding propagation delay time. In step S350, the first control module 144 determines whether the propagation delay time exceeds the target propagation delay value $PD_{max}$. When the propagation delay time exceeds the target propagation delay value $PD_{max}$, in step S355, the first control module 144 finds out the remote antenna unit 160 having a second maximum signal strength and the corresponding propagation delay time, and proceeding to step S350 until the propagation delay time not exceeding the target propagation delay value $PD_{max}$. That is, the first control module 144 finds the remote antenna unit 160, which has the maximum signal strength and the corresponding propagation delay time not exceeding the target propagation delay value $PD_{max}$.

In step S360, the first control module 144 selects the remote antenna unit to be the service antenna unit, and calculates to obtain the corresponding delay compensation value. In step S370, the second control module 146 turns on the selected service antenna unit to perform the downlink signal transmission, and turns off the downlink signal transmission of the other un-selected remote antenna units 160. Meanwhile, the uplink part still performs the receiving operation to keep monitoring the corresponding propagation delay. At the same time, in step S370, the delay compensation modules 148_1 and 148_2 compensate the propagation delay time of the service antenna unit to the target propagation delay value $PD_{max}$ according to the corresponding delay compensation value. Afterwards, in step S380, whether all of the remote antenna units 160 lose the subscriber station is determined. If not all of the remote antenna units 160 lose the subscriber station, it proceeds back to step S330. When all the remote antenna units 160 do not detect the subscriber station, the downlink signal transmission of the remote antenna units 160 is turned off. In step S305, the multiple remote antenna units 160 keep detecting and the first control module 144 determines whether any one of the remote antenna units 160 detects the subscriber station.

The method for calculating delay compensation values of a distributed antenna system disclosed in the above embodiment compensates the propagation delay time to the target propagation delay value $PD_{max}$, thus capable of keeping all the remote antenna units 160 to have the same timing difference between uplink and downlink. In addition, the originally existed periodicity of the distributed antenna system 100 can be used to execute the function of propagation delay time correction, and the propagation delay values estimated according to the advanced knowledge of the length of the used fiber is used to determine the switching timing of the remote antenna units 160 to keep the timing difference between data uplink and data downlink.

In the above embodiment of the method for calculating delay compensation values of a distributed antenna system, the propagation delay time not exceeding the target propagation delay value $PD_{max}$ is the preferential selection condition of the service antenna unit, and the remote antenna unit having the higher signal strength of the receiving signal is selected when the preferential selection condition is met.

Figure 4:
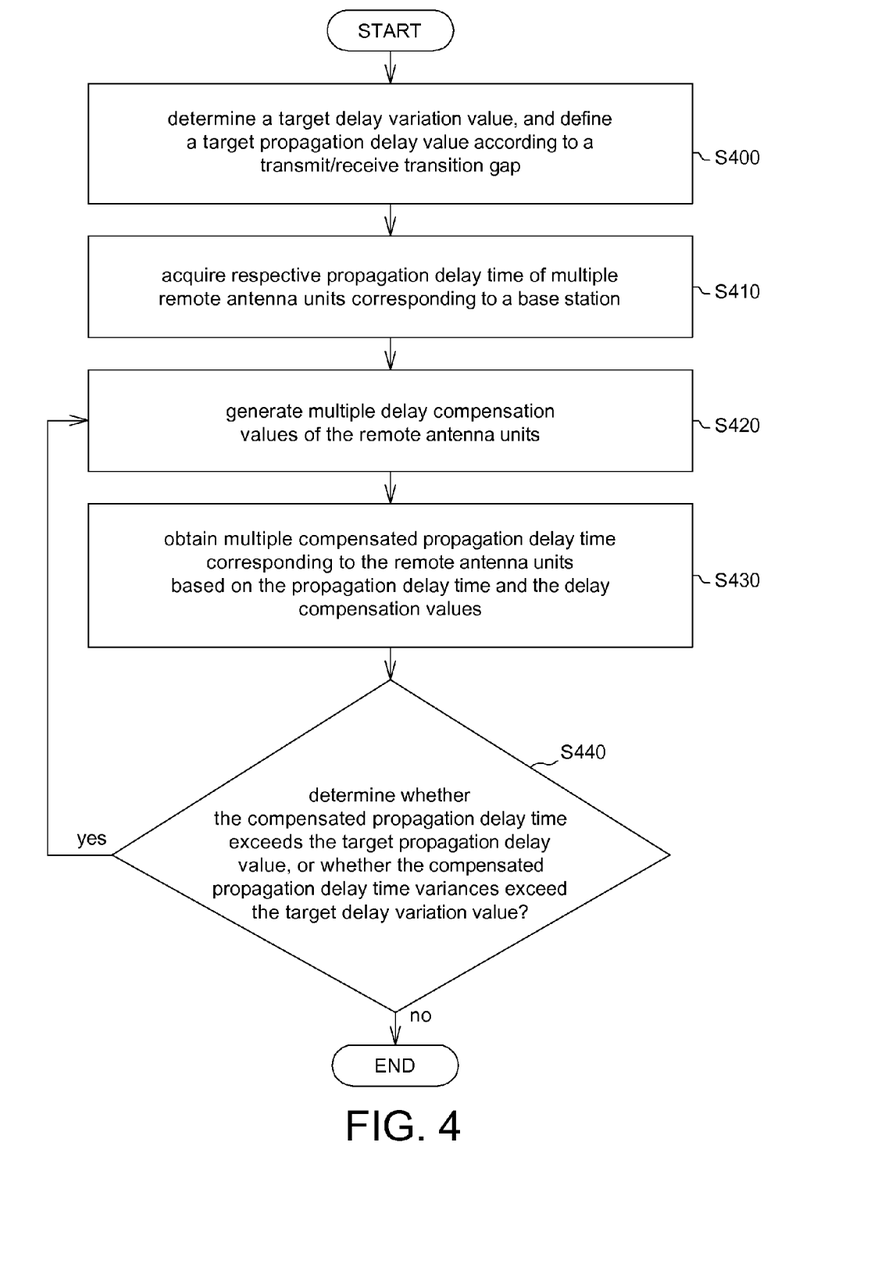
FIG. 4 shows a flow chart of a method for controlling a distributed antenna system according to another embodiment.

Referring to FIG. 4, a flow chart of a method for controlling a distributed antenna system according to another embodiment is shown. In FIG. 4, the delay compensation values of the multiple remote antenna units 160 are calculated according to the acquired multiple remote antenna units 160 in advance. The delay compensation values are used in the method for controlling the antenna in FIG. 5. Hereinafter take the first control module 144 for implementation as being exemplified, and it can be determined by other devices in advance. In step S400, the first control module 144 determines a target delay variation value $TD_{max}$, and defines a target propagation delay value $PD_{max}$ according to a transmit/receive transition gap. The target delay variation value $TD_{max}$ is substantially used to limit the timing drift not to vary dramatically when the remote antenna units 160 are switched. Take the WiMAX system for example, the target delay variation value $TD_{max}$ can be set as ¼ or ½ guard interval (GI) duration, such as 2.75 μs or 5.5 μs according to the system building requirements. In step S410, the estimation module 142 acquires multiple propagation delay time of the multiple remote antenna units 160 corresponding to the base station 120. The propagation delay time is calculated and obtained in advance according to the length of the used fiber. In steps S420, the first control module 144 generates multiple delay compensation values of the remote antenna units 160. The latter FIG. 5 describes the advanced determination of the switching of the service antenna unit which maps a predetermined compensation values. And how to obtain the delay compensation values in FIG. 5 has been described in FIG. 4.

In step S430, the first control module 144 obtains multiple compensated propagation delay time corresponding to the remote antenna units 160 based on the propagation delay time and the delay compensation values. The compensated propagation delay time of each remote antenna unit 160 is the sum of the corresponding propagation delay time and the delay compensation value. In step S440, the first control module 144 determines whether the compensated propagation delay time exceeds the target propagation delay value PDmax, or whether the compensated propagation delay time variances exceed the target delay variation value TDmax. If yes, it proceeds back to step S420, and the first control module 144 assigns multiple new delay compensation values again. Step S440 is main to ensure that the compensated propagation delay time of each remote antenna unit 160 does not exceed the target propagation delay value PDmax, and the compensated propagation delay time variance caused of the service antenna unit by the switching does not exceed the target delay variation value TDmax when the different remote antenna units 160 are switched to be the service antenna unit.

Figure 5:
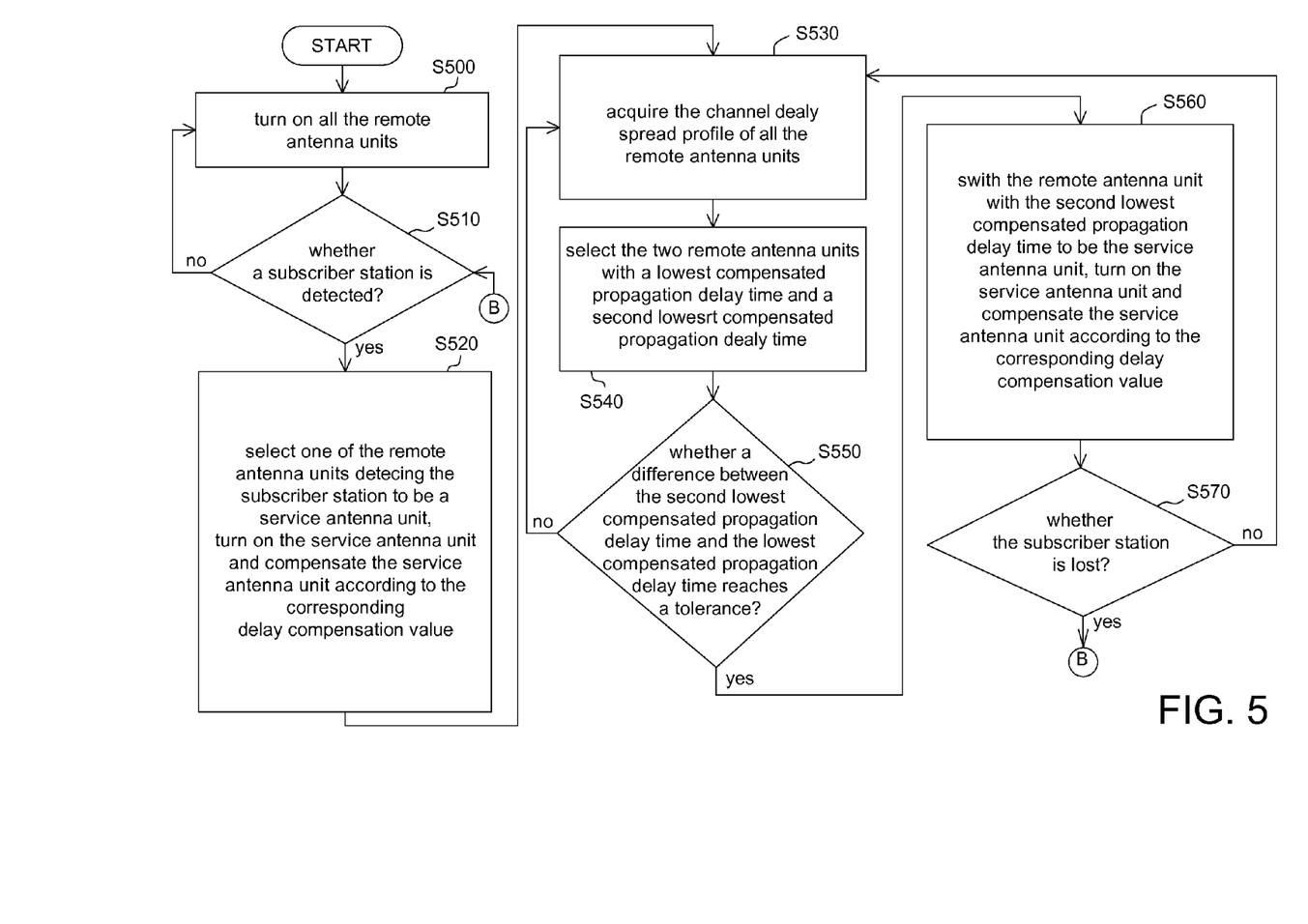
FIG. 5 shows a detailed flow chart of a method for calculating delay compensation values of a distributed antenna system according to another embodiment.

Referring to FIG. 5, a detailed flow chart of a method for calculating delay compensation values of a distributed antenna system according to another embodiment is shown. In step S500, all of the remote antenna units 160 are turned on. In step S510, the first control module 144 determines whether any one of the remote antenna units 160 detects a subscriber station. When any one of the remote antenna units 160 detects the subscriber station, in step S520, the first control module 144 selects the remote antenna unit 160 having the lowest compensated propagation delay time among the remote antenna units 160 detecting the subscriber station to be the service antenna unit. The compensated propagation delay time is the sum of the delay compensation value and the propagation delay time in FIG. 4. The second control module 146 turns on the selected service antenna unit to perform the signal downlink transmission, and turns off the signal downlink transmission of the other un-selected remote antenna units 160. The delay compensation modules 148_1 and 148_2 compensate the service antenna unit according to the corresponding delay compensation value. Meanwhile, the uplink part still performs the receiving operation to keep monitoring the corresponding propagation delay.

In step S530, the estimation module 142 again acquires the channel delay spread profile of the remote antenna units 160. The channel delay spread profile theoretically includes the propagation delay time of all the remote antenna units 160 except for the propagation delay time of the remote antenna unit 160 with a too low signal strength caused by the expressively far distance as time goes by. In step S540, the first control module 144 selects the remote antenna unit 160 having the lowest compensated propagation delay time and the remote antenna unit 160 having the second lowest compensated propagation delay time. In step S550, the first control module 144 determines whether a difference between the second lowest compensated propagation delay time and the lowest compensated propagation delay time reaches a tolerance. The tolerance is less than the target delay variation value TDmax, and larger than or equal to 0, such as 0.5 μs. If not, it proceeds back to step S530.

When the difference between the second lowest compensated propagation delay time and the lowest compensated propagation delay time reaches the tolerance, in step S560, the first control module 144 switches the remote antenna unit 160 having the second lowest compensated propagation delay time to be the service antenna value, the second control module 146 turns on the service antenna unit and turns off the other un-selected remote antenna units 160, and the delay compensation module 148_1 and 148_2 compensate the service antenna unit according to the corresponding delay compensation value. Afterwards, in step S570, whether all of the remote antenna units 160 lose the subscriber station is determined. If not, it proceeds back to step S530. When all the remote antenna units 160 do not detect the subscriber station, it proceeds back to step S510, and the multiple remote antenna unit 160 keep detecting and the first control module 144 determines whether any one of the remote antenna units 160 detects the subscriber station.

The above-mentioned method for controlling a distributed antenna system makes the compensated propagation delay variation of the remote antenna units caused by switching smoother, and errors less than the target propagation delay value $PD_{max}$ is processed by the original propagation delay time self-correction function of the system. Moreover, a fixed-delay device can be utilized to lower the overall circuitry complexity due to the advanced obtained delay compensation values through the knowledge of the system information.

Figure 6:
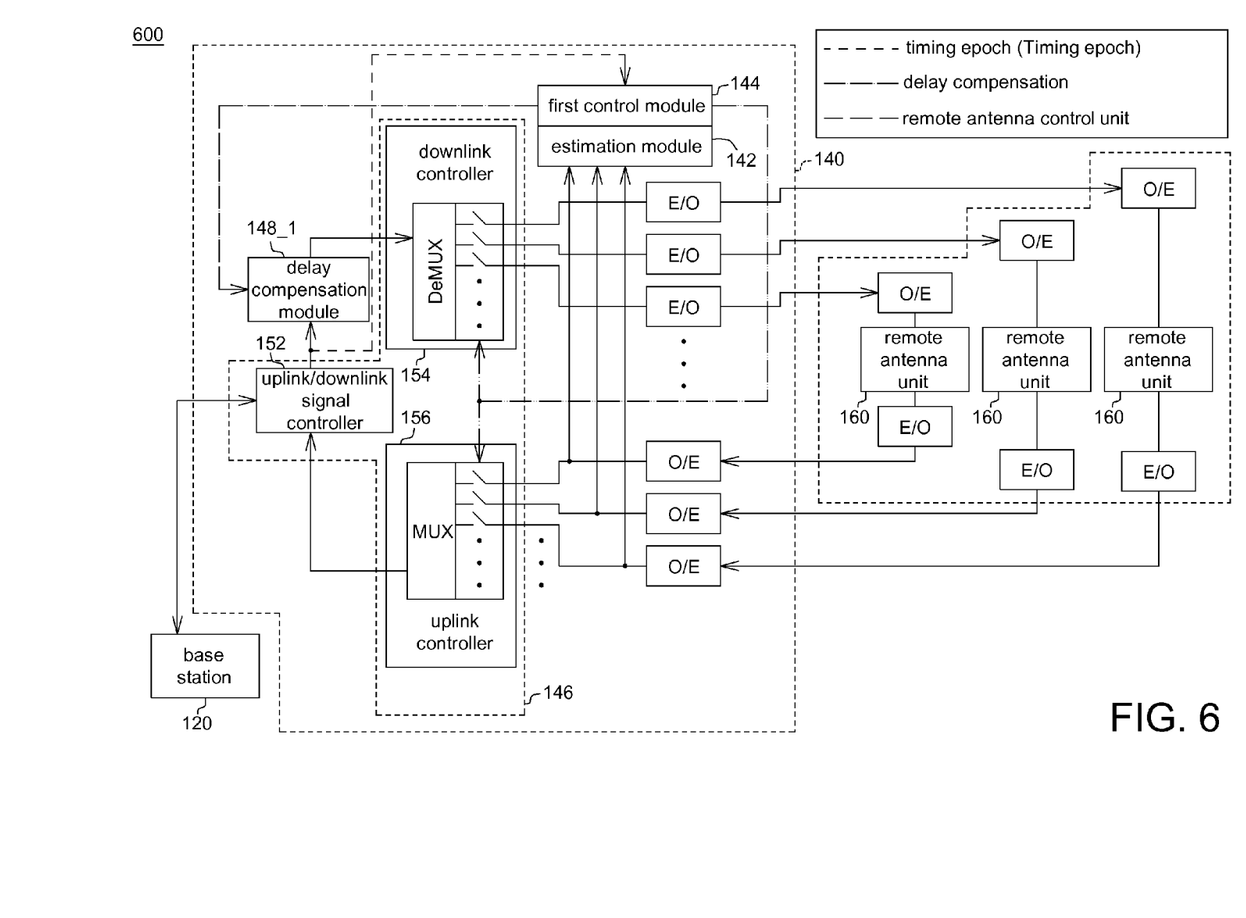
FIG. 6 shows a schematic illustration of a distributed antenna system according to another embodiment.
Figure 7:
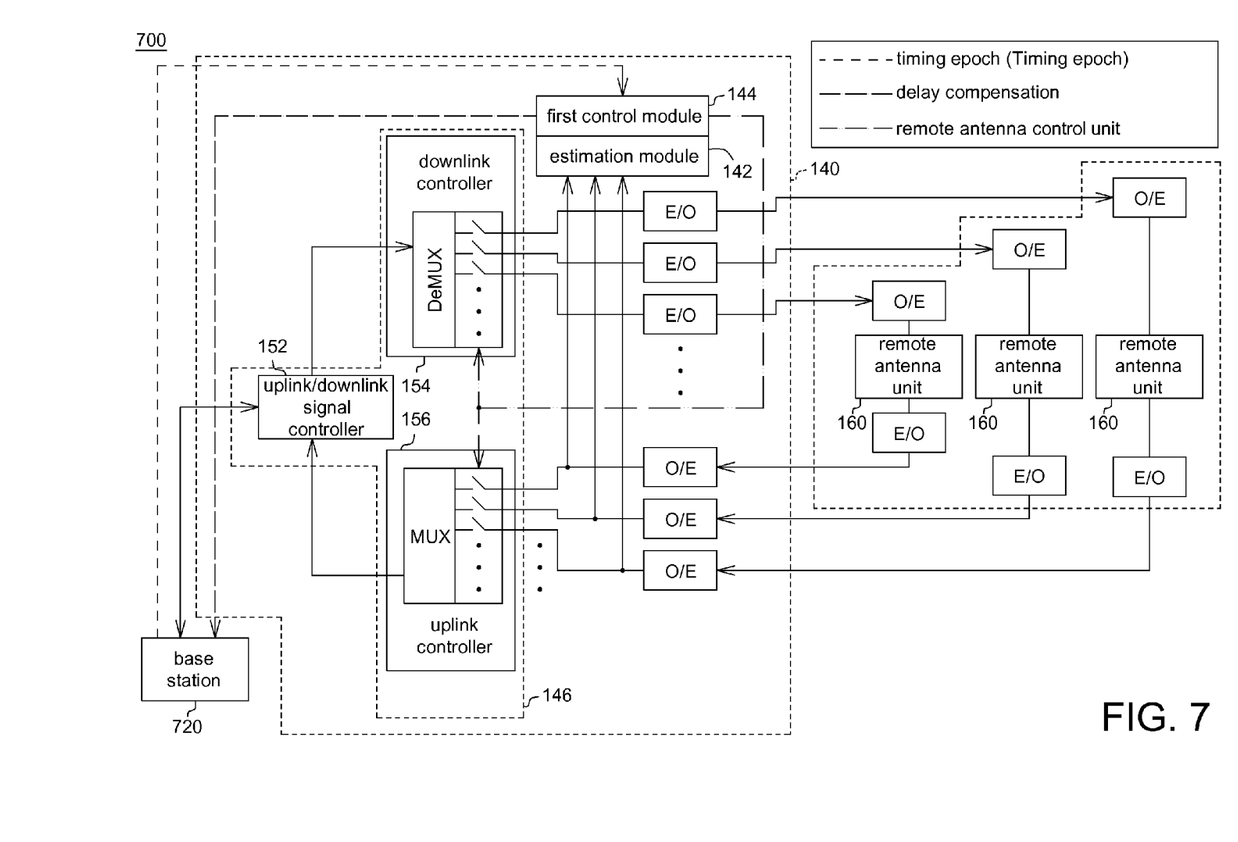
FIG. 7 shows a schematic illustration of a distributed antenna system according to another embodiment.

In addition, although the distributed antenna system 100 utilizes the two delay compensation modules 148_1 and 148_2 which are respectively disposed in the downlink path and the uplink path, one single delay compensation module can be only used, as shown in FIG. 6, showing a schematic illustration of a distributed antenna system according to another embodiment. The distributed antenna system 600 is similar to the distributed antenna system 100 as the difference is that the distributed antenna system 600 only utilizes the single delay compensation module 148_1 disposed in the downlink path. Furthermore, the delay compensation function can be integrated into the base station, so that the base station and the subscriber station adjust the transmission parameters to keep the timing difference between data uplink and data downlink, as shown in FIG. 7, showing a schematic illustration of a distributed antenna system according to another embodiment. In the distributed antenna system 700, the base station 720 integrates the function of the original delay compensation module. When the first control module 144 selects the service antenna unit, the base station 720 obtains the delay compensation value of the service antenna unit and transmits the delay compensation value to the subscriber station, so that the subscriber station adjusts the uplink transmission time accordingly to the delay compensation value to keep the timing difference between data uplink and data downlink.

Figure 8:
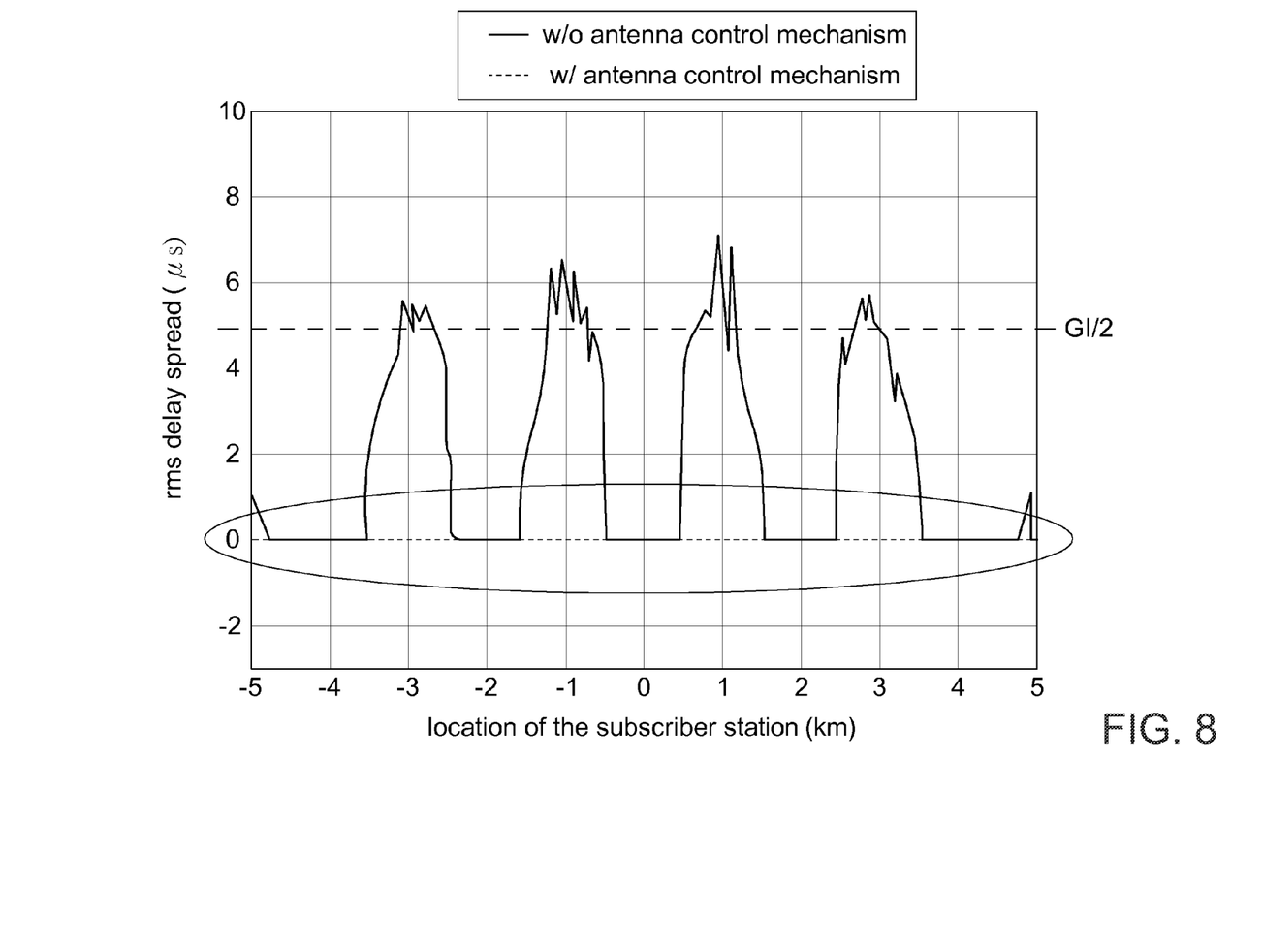
FIG. 8 shows a mimic diagram of a distributed antenna system applying the antenna control mechanism and the RoF technique according to an embodiment.
Figure 9:
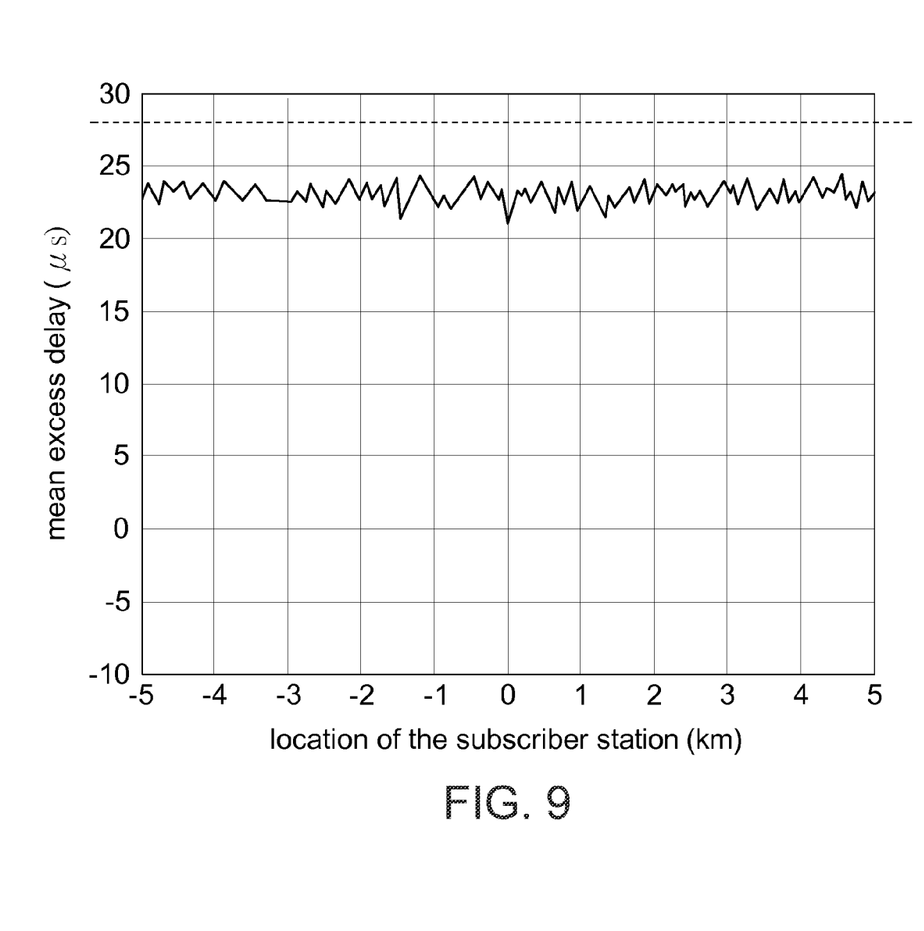
FIG. 9 shows a mimic diagram illustrating the antenna control mechanism applying a target propagation delay value according to an embodiment.
Figure 10:
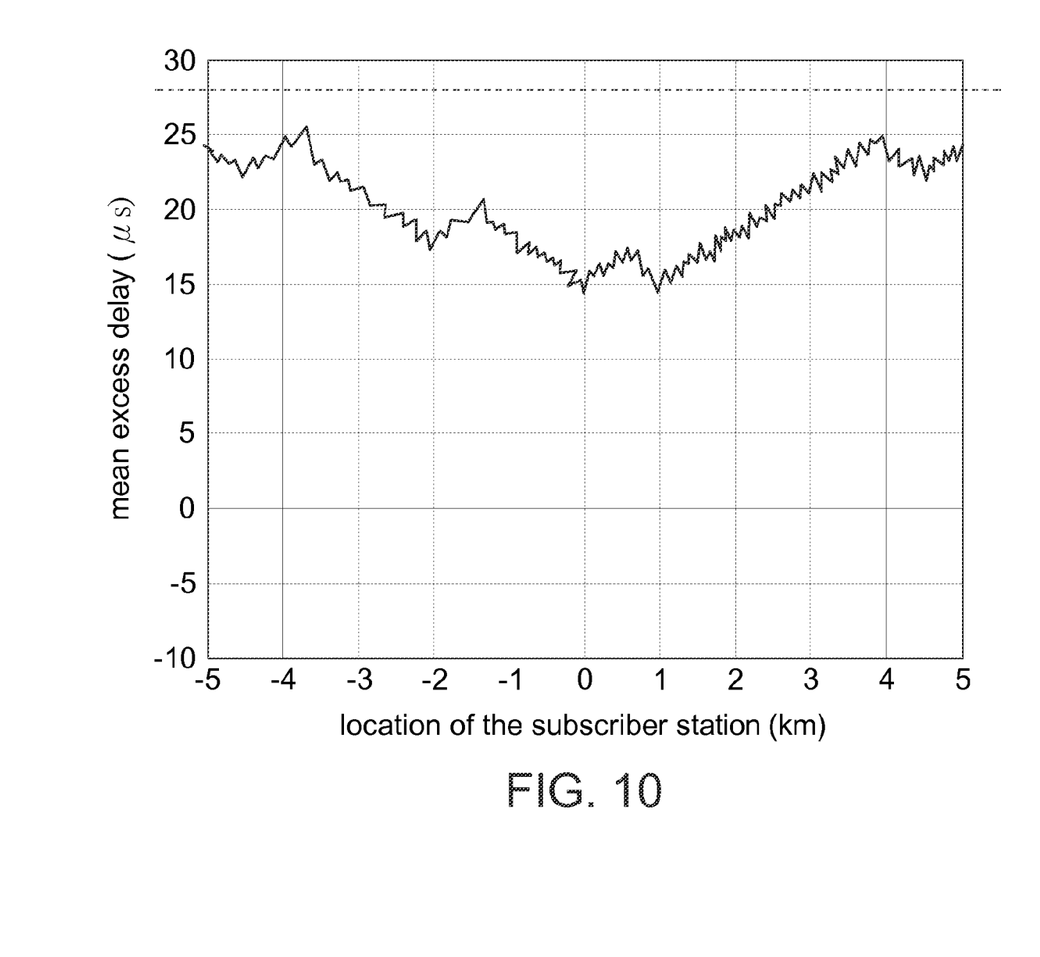
FIG. 10 shows a mimic diagram of the antenna control mechanism applying a target delay variation value and a target propagation delay value according to another embodiment.

In following FIG. 8 to FIG. 10, the horizontal axis is the location of the subscriber station, representing the relative location relationship between the subscriber station and the base station in one dimension space, and 0 represents the location of the base station. Referring to FIG. 8, a mimic diagram of a distributed antenna system applying the antenna control mechanism and the RoF technique according to an embodiment is shown. It can be observed in FIG. 8 that before applying the antenna control mechanism of the disclosure, the distributed antenna system suffers the serious multipath effect; after applying the antenna control mechanism of the disclosure, the multipath effect is removed effectively. Referring to FIG. 9, a mimic diagram illustrating the antenna control mechanism applying a target propagation delay value according to an embodiment is shown. It can be obtained from FIG. 9 that the timing difference between the uplink path and the downlink path is kept to be less than the target propagation delay value.

Referring to FIG. 10, a mimic diagram of the antenna control mechanism applying a target delay variation value and a target propagation delay value according to another embodiment is shown. It can be obtained from FIG. 10 that the timing difference between the uplink path and the downlink path is kept to be less than the target propagation delay value, and the variation is smooth and kept to be less than the target delay variation value.

The disclosure proposes methods, apparatus and system for controlling a distributed antenna system, capable of utilizing an antenna control mechanism, selecting the service antenna unit and compensating the corresponding propagation delay time, to solve the multipath effect problem of the distributed antenna system caused by the base station and to compensate the timing drift problem caused by the antenna control mechanism.

While the disclosure has been described by way of example and in terms of preferred embodiments, it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for controlling a distributed antenna system comprising a control device, comprising:
   the control device,
   defining a target propagation delay value according to a transmit/receive transition gap;
   estimating a propagation delay time of a service antenna unit corresponding to a base station; and
   turning on the service antenna unit to perform downlink signal transmission through the service antenna unit, and compensating the propagation delay time of the service antenna unit to the target propagation delay value.

2. The method for controlling a distributed antenna system according to claim 1, further comprising:
   turning on a plurality of remote antenna units of the distributed antenna system; and
   selecting a remote antenna unit, which detects a subscriber station, among the plurality of remote antenna units to be the service antenna unit.

3. The method for controlling a distributed antenna system according to claim 1, further comprising:
   acquiring signal strengths of receiving signals, received from a subscriber station, of a plurality of remote antenna units of the distributed antenna system, and estimating respective propagation delay time of the plurality of remote antenna units corresponding to the base station;
   selecting a remote antenna unit, which has a maximum signal strength and which has corresponding propagation delay time not exceeding the target propagation delay value, to be the service antenna unit; and
   turning off the downlink signal transmission of the other un-selected remote antenna units.

4. The method for controlling a distributed antenna system according to claim 3, further comprising:
   turning off the downlink signal transmission of the plurality of remote antenna units when all the plurality of remote antenna units of the distributed antenna system do not detect the subscriber station.

5. The method for controlling a distributed antenna system according to claim 1, wherein the propagation delay time of the service antenna unit does not exceed the target propagation delay value, and the service antenna unit receives a receiving signal with a maximum signal strength from a subscriber station.

6. The method for controlling a distributed antenna system according to claim 1, wherein the target propagation delay value is a half of a difference between the transmit/receive transition gap and a subscriber station receive/transmit transition gap.

7. A method for controlling a distributed antenna system comprising a control device, the method comprising:
   the control device,
   determining a target delay variation value, and defining a target propagation delay value according to a transmit/receive transition gap;
   acquiring respective propagation delay time of a plurality of remote antenna units corresponding to a base station to obtain respective delay compensation value of the plurality of remote antenna units by referring to the target propagation delay value; and
   compensating a service antenna unit according to corresponding delay compensation value when one of the plurality of remote antenna units are turned on to be the service antenna unit to perform downlink signal transmission;
   wherein a compensated propagation delay time of each remote antenna unit does not exceed the target propagation delay value, and the compensated propagation delay time is a sum of the respective propagation delay time and the respective delay compensation value;
   wherein when different remote antenna units are switched to be the service antenna unit, a compensated propagation delay time variance of the service antenna unit caused by switching does not exceed the target delay variation value.

8. The method for controlling a distributed antenna system according to claim 7, further comprising:
   selecting a remote antenna unit having a lowest compensated propagation delay time, among the plurality of remote antenna units which detect a subscriber station, to be the service antenna unit, turning on the service antenna unit to perform downlink signal transmission and turning off the downlink signal transmission of the other un-selected remote antenna units;
   acquiring the respective propagation delay time of the plurality of remote antenna units again;
   selecting the remote antenna unit having the lowest compensated propagation delay time and the remote antenna unit having a second lowest compensated propagation delay time;

switching the remote antenna unit having the second lowest compensated propagation delay time to be the service antenna unit when a difference between the second lowest compensated propagation delay time and the lowest compensated propagation delay time reaches a tolerance; and turning on the service antenna unit and compensating the service antenna unit according to the corresponding delay compensation value.

9. The method for controlling a distributed antenna system according to claim 8, further comprising:

turning off the downlink signal transmission of the plurality of remote antenna units when all the plurality of remote antenna units do not detect the subscriber station.

10. The method for controlling a distributed antenna system according to claim 7, wherein the target propagation delay value is a half of a difference between the transmit/receive transition gap and a subscriber station receive/transmit transition gap.

11. A method for controlling a distributed antenna system comprising a control device, the method comprising:

a control device, estimating respective propagation delay time of a plurality of remote antenna units corresponding to a base station;

selecting one of the plurality of remote antenna units to be a service antenna unit according to a target propagation delay value and the propagation delay time of the plurality of remote antenna units, and obtaining a delay compensation value corresponding to the service antenna unit;

turning on or turning off downlink signal transmission of the plurality of remote antenna units; and compensating the service antenna unit according to corresponding delay compensation value when the service antenna unit is turned on.

12. The method for controlling a distributed antenna system according to claim 11, wherein the target propagation delay value is a half of a difference between a transmit/receive transition gap and a subscriber station receive/transmit transition gap.

13. The method for controlling a distributed antenna system according to claim 11, wherein the propagation delay time of the service antenna unit corresponding to the base station is estimated, the service antenna unit is turned on to perform the downlink signal transmission and the downlink signal transmission of the other un-selected remote antenna units is turned off, and the propagation delay time corresponding to the service antenna unit is compensated to the target propagation delay value.

14. The method for controlling a distributed antenna system according to claim 13, wherein the plurality of remote antenna units are turned on, and a remote antenna unit is selected, which detects a subscriber station, among the plurality of remote antenna units to be the service antenna unit.

15. The method for controlling a distributed antenna system according to claim 13, wherein signal strengths of receiving signals, received from a subscriber station, of the plurality of remote antenna units are acquired and propagation delay time of the plurality of remote antenna units corresponding to the base station is estimated, a remote antenna unit is selected, which has a maximum signal strength and which has corresponding propagation delay time not exceeding the target propagation delay value, to be the service antenna unit, the service antenna unit is turned on to perform the downlink signal transmission and turns off the downlink signal transmission of the other un-selected remote antenna units is turned off, and the propagation delay time of the service antenna unit is compensated to the target propagation delay value.

16. The method for controlling a distributed antenna system according to claim 15, wherein the downlink signal transmission of the plurality of remote antenna units is turned off when all the plurality of remote antenna units do not detect the subscriber station.

17. The method for controlling a distributed antenna system according to claim 13, wherein the propagation delay time of the service antenna unit does not exceed the target propagation delay value, and the service antenna unit receives a receiving signal with a maximum signal strength from a subscriber station.

18. The method for controlling a distributed antenna system according to claim 11, wherein the respective propagation delay time of the plurality of remote antenna units corresponding to the base station is acquired, and respective delay compensation values of the plurality of remote antenna units is obtained by referring to the target propagation delay value;

wherein a compensated propagation delay time of each remote antenna unit does not exceed the target propagation delay value, and the compensated propagation delay time is a sum of the respective propagation delay time and the respective delay compensation value;

wherein when different remote antenna units are switched to be the service antenna unit, a compensated propagation delay time variance of the service antenna unit caused by switching does not exceed a target delay variation value.

19. The method for controlling a distributed antenna system according to claim 18, wherein the remote antenna unit, having a lowest compensated propagation delay time, among the remote antenna units detecting a subscriber station is selected to be the service antenna unit, the service antenna unit is turned on, the respective propagation delay time of the plurality of remote antenna units is acquired again, a remote antenna unit having the lowest compensated propagation delay time and a remote antenna unit having a second lowest compensated propagation delay time are selected, the remote antenna unit having the second lowest compensated propagation delay time is switched to be the service antenna unit when a difference between the second lowest compensated propagation delay time and the lowest compensated propagation delay time reaches a tolerance, the service antenna unit is turned on to perform the downlink signal transmission and turns off the downlink signal transmission of the other un-selected remote antenna units is turned off, and the service antenna unit is compensated according to the corresponding delay compensation value.

20. The method for controlling a distributed antenna system according to claim 18, wherein the second control module turns off the downlink signal transmission of the plurality of remote antenna units is turned off when all the plurality of remote antenna units do not detect a subscriber station.

21. A system for controlling a distributed antenna system, comprising:

a base station;

an estimation module for estimating respective propagation delay time of a plurality of remote antenna units corresponding to the base station;

a first control module for selecting one of the plurality of remote antenna units to be a service antenna unit according to a target propagation delay value and the propagation delay time of the plurality of remote antenna units, and obtaining delay compensation values corresponding to the plurality of remote antenna units; and a second control module, controlled by the first control module, for turning on or turning off downlink signal transmission of the plurality of remote antenna units;

wherein when the first control module selects the service antenna unit according to the target propagation delay value and the propagation delay time of the plurality of remote antenna units, the base station obtains delay compensation value of the service antenna unit and transmits to a subscriber station, so that the subscriber station adjusts uplink transmission time according to a received delay compensation value.

* * * * *